United States Patent [19]

Hörler

[11] 4,170,107

[45] Oct. 9, 1979

[54] METHOD AND APPARATUS FOR INTERCOOLING THE CHARGE AIR OF A PRESSURE-CHARGED INTERNAL COMBUSTION ENGINE

[75] Inventor: Hansulrich Hörler, Zürich, Switzerland

[73] Assignee: BBC Brown, Boveri & Company Limited, Baden, Switzerland

[21] Appl. No.: 824,794

[22] Filed: Aug. 15, 1977

[30] Foreign Application Priority Data

Oct. 15, 1976 [CH] Switzerland .................. 13081/76

[51] Int. Cl.² ............................................. F02C 3/02
[52] U.S. Cl. ..................................... 60/39.45; 417/64
[58] Field of Search .................... 123/119 CD, 119 C; 60/599, 39.45; 417/64

[56] References Cited

U.S. PATENT DOCUMENTS

| | | | |
|---|---|---|---|
| 3,095,704 | 7/1963 | Spalding | 60/39.45 |
| 3,159,002 | 12/1964 | Spalding | 60/39.45 |
| 3,398,525 | 8/1968 | Jenny | 60/39.45 |

*Primary Examiner*—Ronald H. Lazarus
*Attorney, Agent, or Firm*—Werner W. Kleeman

[57] ABSTRACT

A method of, and apparatus for, intercooling the charge air of a pressure-charged internal combustion engine by way of an air-cooled heat exchanger, the internal combustion engine being pressure-charged by a gas-dynamic pressure-wave machine. The entire quantity of outside air drawn in by the pressure-wave machine is divided into a partial stream of scavenging air and a partial stream of charge air. The scavenging air flows through the heat exchanger as a coolant and upon leaving the latter performs its intended scavenging function in the pressure-wave process, and the charge air, having been compressed in the pressure-wave process, is intercooled in the scavenging air-cooled heat exchanger.

8 Claims, 2 Drawing Figures

METHOD AND APPARATUS FOR INTERCOOLING THE CHARGE AIR OF A PRESSURE-CHARGED INTERNAL COMBUSTION ENGINE

BACKGROUND OF THE INVENTION

The present invention relates to a new and improved method of intercooling the charge air of a pressure-charged internal combustion engine, the internal combustion engine being pressure-charged by a gas-dynamic pressure-wave machine. The invention further concerns new and improved apparatus for implementing the aforesaid method.

Air-to-air cooling of the charge air of an internal combustion engine is known to the art (see e.g. Publication no. 1A.43-1-30M of the firm of Mack, Allentown, Pennsylvania). The charge air compressed in a turbocharger flows through a heat exchanger into the intake system of the internal combustion engine. Before the heat exchanger, part of the compressed charge air, is bled-off and expanded in a turbine which is coupled directly to a fan for the heat exchanger. The fan draws in ambient air by way of an air filter and conveys it through the cooler and back to the surroundings.

Another known method (German Pat. No. 2,406,020) provides that all the charge air, having passed through the heat exchanger, should flow through a turbine which is coupled directly to a fan for the heat exchanger. As with the first known method, the fan in this case also draws in ambient air and conveys it through the cooler and back to the surroundings.

A disadvantage with both of the above-discussed methods is the fact that, firstly, there is required a separate drive turbine with a therewith coupled fan, for cooling the charge air, and secondly, the heated cooling air is discharged to the surroundings without any further useful effect.

Both of the cooling methods heretofore mentioned are employed with internal combustion engines that are pressure-charged by means of turbochargers.

SUMMARY OF THE INVENTION

The present invention, however, relates to the cooling of charge air when an internal combustion engine is pressure-charged by a gas-dynamic pressure-wave machine. Owing to the known operating principle of the pressure-wave machine (see e.g. Publication CH-T-123063 of BBC Brown, Boveri & Company Limited, Baden, Switzerland), which is briefly explained in the following description, intercooling of the charge air is particularly attractive because for the same density conditions, higher charge air temperatures occur than with exhaust-gas pressure-charging, owing to the heat exchange across the cell walls of the rotor. Consequently, intercooling in the case of pressure-charging with pressure-wave machines yields a greater gain in density than turbocharging.

With the foregoing in mind, it is a primary object of the present invention to create a method of the type stated above, and apparatus useful in the performance thereof, which can be implemented without additional transport of air and without moving parts.

Another important object of the present invention aims at the provision of a new and improved method of, and apparatus for, intercooling the charge air of a pressure-charged internal combustion engine by way of an air-cooled heat exchanger in a manner which is more efficient, simple and reliable than the heretofore known techniques and not associated with the limitations thereof.

Now in order to implement these objects and others, which will become more readily apparent as the description proceeds, the method of the invention contemplates that the entire quantity of air drawn in by the pressure-wave machine is divided into a partial stream of scavenging air and a partial stream of charge air, whereupon the scavenging air flows through the heat exchanger as a coolant and upon leaving the latter performs its intended scavenging function in the pressure-wave process, and the charge air, having been compressed in the pressure-wave process, is intercooled in the scavenging-air-cooled heat exchanger.

Apart from the benefits inherent in cooling the charge air, such as increased power, reduced heat loss, improved mechanical efficiency and lower fuel consumption, the particular advantage of the invention resides in the fact that the scavenging air necessary for the pressure-wave process can now be further usefully employed without incurring any impairment of the machine's characteristic.

It is of particular advantage if the scavenging ratio, i.e. the ratio of scavenging air flow rate to charge-air flow rate, is at least 0.4 over the utilized full-load speed range of the internal combustion engine, and if scavenging air and charge air are admitted to the pressure-wave process spatially separated. Of benefit here is the fact that the actual charge air still has the low intake temperature prior to compression.

The apparatus intended to implement the method of the invention is based on the notion of little cost and expenditure and the use of only non-moving components. This is achieved in that from the air intake stub to the low-pressure air inlet port, the air casing of the pressure-wave machine is divided by a partition into two ducts, and that the coolant-side connections of a heat exchanger are located in the duct provided for the scavenging air. It is also significant that heat exchanger connections for the charge air to be cooled are located in the high-pressure air duct of the air casing. This means that if charge air cooling is to be used with an existing pressure-wave machine, it is necessary to change only the air casing.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
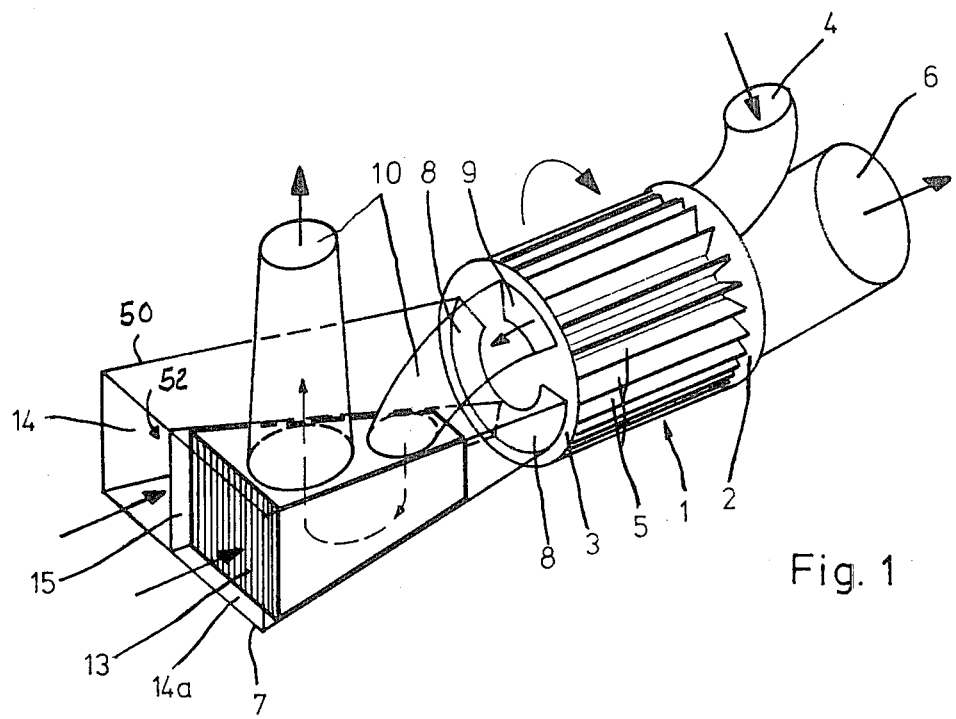
FIG. 1 shows a gas-dynamic pressure-wave machine to which a heat exchanger is attached.

Describing now the drawings, in the perspective illustration of FIG. 1, which shows the basic configuration of the pressure-wave machine, for reasons of clarity parts not essential to the invention have been conveniently omitted. Such parts include the pressure-charged internal combustion engine, the drive and bearings of the pressure-wave machine, the jacket enclosing the cell wheel 1 and also the outer contours of the air casing and gas casing. The detailed construction can be seen in Publication CH-T 123 123 issued by the aforementioned firm of BBC, Brown, Boveri & Company Limited, Baden, Switzerland, which shows the individual components constituting the machine and also an assembled machine in cross-section, and the disclosure of which is incorporated herein by reference. Also, for the sake of simplicity of pressure-wave machine illustrated is shown as a single-cycle machine, the effect of this being that the end face 2 of the gas casing and the end face 3 of the air casing are each provided with only one high-pressure port and one low pressure port, while the gas-side ports are not shown. To indicate more clearly how the system functions, the flow directions of the working media and the direction of rotation of the pressure-wave machine are represented by arrows.

The hot exhaust gases from the internal combustion engine pass through the high-pressure gas inlet 4 and enter the cell wheel 1 which incorporates axially aligned cells 5, open at both ends, in which the gases expand and leave the machine via the low-pressure gas outlet 6 into the exhaust (not shown). On the air side, outside air is drawn in at air intake stub 7, flows by way of the low-pressure air inlet port 8 axially into the cell wheel 1 where it is compressed, and leaves the machine as charge air, passing to the engine by way of high-pressure air outlet port 9 and high-pressure air duct 10.

Figure 2:
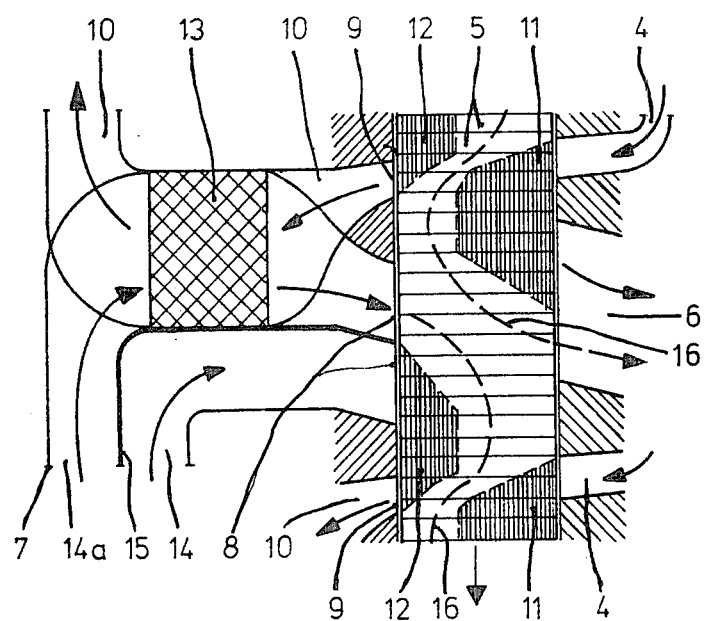
FIG. 2 shows the development of a cylindrical section through the cell wheel at half the height of the cells, and through the adjacent portions of the side parts of the casing.

For an explanation of the actual gas-dynamic pressure-wave process, which is extremely complex and does not constitute subject matter of the present invention, reference should be made to Publication CH-T-123 063 mentioned above. The sequence of events of the process necessary to understand the invention is described with reference to FIG. 2, in which the parts are identified by the same symbols as in FIG. 1. The strip of cells 5 is the development of a cylindrical section of cell wheel 1, the strip moving downwards in the direction of the non-referenced arrow when the wheel rotates. The pressure-wave phenomena take place inside the cell wheel, the effect being essentially the formation of a gas-filled space 11 and an air-filled space 12. In space 11 the exhaust gas expands and then escapes into the low-pressure gas outlet 6, while in space 12 a part of the ingested outside air is compressed and discharged into the high-pressure air duct 10. The remaining quantity of outside air is flushed through the cell wheel 1 into the low-pressure gas outlet 6, thus ensuring that the exhaust gases are fully expelled. This scavenging is essential to the process and must be maintained under all circumstances. The reason for this is that exhaust gas must at all costs be prevented from remaining in the cell wheel and from being passed to the engine with the charging air during a subsequent cycle. In addition thereto, the scavenging air beneficially cools the cell walls, which are greatly heated by the hot exhaust gases.

In accordance with the present invention, the air drawn in by the pressure-wave machine is now divided into a partial stream of scavenging air and a partial stream of charge air. The charge air portion is fed directly to the cell wheel 1 (after the scavenging air portion when viewed in the direction of rotation of the cell wheel) where it undergoes the pressure-wave process. The scavenging air is passed as a coolant to the heat exchanger 13 shown symbolically in FIG. 2, leaves the latter at a temperature higher than the intake temperature, and thereafter performs its scavenging function in the pressure-wave process. The flow through the cell wheel 1 follows the broken line 16, the scavenging air leaving the machine in the next cycle. It is to be understood, as will be explained below with the aid of a numerical example, that the temperature of the scavenging air is still sufficiently low to cool the cell walls. The compressed charge air is intercooled in the heat exchanger 13 before it passes to the intake system of the internal combustion engine. What charge air temperature is achieved in this way will depend, among other things, on the efficiency of the heat exchanger used. Since, moreover, account must be taken of the pressure losses occurring at the exchange surfaces, the choice of cooler is an optimization problem which must be resolved in each specific case.

An example of charge air cooling with a charging pressure ratio of 2.5 and an air intake temperature of 20° C. gives a temperature rise of 85° C. for charge air and for scavenging air with a scavenging rate of 1, if the aim is charge air with a temperature of 60° C. The scavenging air used as a coolant is accordingly heated to 105° C., at which it is still able to carry out a cooling function. To obtain maximum cooling of the charge air with a relatively uncomplicated cooler, the scavenging rate must be at least 1.0. If operation is at lower loads the scavenging rate can fall sharply, owing to the way the pressure-wave machine works. Cooling of the charge air can then be dispensed with, but at partial loads this is of no consequence because the thermal conditions in the internal combustion engine no longer necessitate cooling.

The apparatus for implementing the method of cooling is shown in FIG. 1. The low-pressure air inlet 50 in the inlet casing 52 is divided by a partition 15 into two ducts 14, 14a leading from the air intake stub 7 to the low-pressure air inlet port 8. The flow cross-sections are divided geometrically according to the desired scavenging rate of the pressure-wave machine at the nominal output of the internal combustion engine. Spatially separating the charge air from the scavenging air up to the inlet plane of the cell wheel 1 also means that the flow rates can be regulated separately, if it is required to make such provision in the future.

A heat exchanger 13 is contained in the duct 14a provided for the scavenging air. This is preferably a recuperative cooler in which the coolant passes transversely to the medium being cooled. The cooler configuration is so arranged that dismantling and assembly are simple for maintenance purposes.

The high-pressure air duct 10 is divided into two streams, one stream leading from the high-pressure air outlet port 9 to the heat exchanger 13, and the second stream leading from the heat exchanger 13 to the intake system of the internal combustion engine. With an arrangement of this kind the compressed charge air is deflected within the cooler across the cooling air once (broken-line flow path in FIG. 1) or more than once.

The invention is of course not restricted to what is shown in the drawings and presented in the description. It is, for example, quite conceivable that the heat exchanger is not incorporated in the air casing, but is located outside it. The required solution can depend, among other things, on the space available in the engine space. A cooler that operates on the counter-flow principle is also not beyond the scope of the invention. Also, the figures given in the example are to be considered only as particularly favorable values. It is to be understood that with the method of the invention the charge air can without difficulty be cooled to a temperature only very slightly above the intake temperature. It will similarly be evident to the person skilled in the art that the method can be successfully applied with charging-pressure ratios of 1.5 and above.

While there are shown and described present preferred embodiments of the invention, it is to be distinctly understood that the invention is not limited thereto, but may be otherwise variously embodied and practiced within the scope of the following claims. Accordingly,

What I claim is:

1. In a method for intercooling the charge air of a pressure-charged internal combustion engine by way of an air-cooled heat exchanger, wherein the internal combustion engine is pressure-charged with a gas-dynamic pressure-wave machine, the improvement which comprises the steps of:
    dividing the entire quantity of outside air drawn-in by the pressure-wave machine into a partial stream of scavenging air and a partial stream of charge air;
    directing the scavenging air to flow as a coolant through the heat exchanger and upon leaving the latter directing said scavenging air through said pressure wave machine so as to perform its intended scavenging function in the pressure-wave process; and
    compressing the charge air in the pressure-wave machine and intercooling the compressed charge air upon bearing the pressure-wave machine by passing such compressed charge air in the heat exchanger cooled by the scavenging air.

2. The method as defined in claim 1, including the step of:
    selecting the partial stream of scavenging air to be equal to at least 40% of the charge-air flow rate over the utilized full-load speed range of the internal combustion engine.

3. The method as defined in claim 1, further including the steps of:
    admitting the scavenging air and charge air spatially separated from one another to the pressure-wave process performed by the pressure-wave machine.

4. The method as defined in claim 3, wherein:
    when considered in the sequence of events of the pressure-wave process, introducing the scavenging air into the process before the charge air.

5. The method as defined in claim 1, used in conjuction with an internal combustion engine having an air-side pressure greater than 1.5.

6. In an apparatus for intercooling the charge air of a pressure-charged internal combustion engine by way of an air-cooled heat exchanger, wherein the internal combustion engine is pressure-charged with a gas-dynamic pressure-wave machine performing a pressure-wave process, the improvement which comprises:
    said pressure-wave machine having a low-pressure air inlet port;
    an air casing provided for the pressure-wave machine;
    an air intake stub provided for said air casing;
    partition means for dividing the air casing of the pressure-wave machine from the air intake stub to the low-pressure air inlet port into two ducts, wherein one of said ducts has scavenging air flowing therethrough and the other of said ducts has charge air flowing therethrough;
    a heat exchanger cooperating with said pressure-wave machine;
    said heat exchanger being located in said one of said two ducts provided for the scavenging and compressed charge air.

7. The apparatus as defined in claim 6, wherein:
    said air casing is provided with a high-pressure air duct;
    said heat exchanger being connected with the high-pressure air duct of the air casing.

8. The apparatus as defined in claim 5, wherein:
    said heat exchanger comprises a recuperative cooler wherein the coolant flows transversely to the charge air.

* * * * *